United States Patent
Kim et al.

(10) Patent No.: US 10,545,282 B2
(45) Date of Patent: Jan. 28, 2020

(54) DISPLAY APPARATUS

(71) Applicant: SAMSUNG ELECTRONICS CO., LTD., Gyeonggi-do (KR)

(72) Inventors: Hyung-ki Kim, Anyang-si (KR); Dae-young Kim, Suwon-si (KR); Yong-sung Yoo, Suwon-si (KR); Kil-hong Lee, Suwon-si (KR); Duk-jin Jeon, Bucheon-si (KR); Tae-hee Jeon, Namyangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/107,335

(22) Filed: Aug. 21, 2018

(65) Prior Publication Data
US 2019/0121018 A1   Apr. 25, 2019

(30) Foreign Application Priority Data

Oct. 19, 2017   (KR) .................. 10-2017-0135996

(51) Int. Cl.
*G02F 1/1333* (2006.01)
*F21V 8/00* (2006.01)
*G02F 1/1335* (2006.01)

(52) U.S. Cl.
CPC ......... *G02B 6/0088* (2013.01); *G02B 6/0025* (2013.01); *G02B 6/0031* (2013.01); *G02B 6/0051* (2013.01); *G02B 6/0055* (2013.01); *G02F 1/133308* (2013.01); *G02F 1/133606* (2013.01)

(58) Field of Classification Search
CPC .................................................. G02B 6/0088
See application file for complete search history.

(56) References Cited

U.S. PATENT DOCUMENTS

| 7,318,665 | B2 | 1/2008 | Chung |
| 7,404,662 | B2 | 7/2008 | Liao |
| 2002/0060758 | A1* | 5/2002 | Jeong ................... G02B 6/0068 349/65 |

(Continued)

FOREIGN PATENT DOCUMENTS

| JP | 2003-249112 A | 9/2003 |
| KR | 10-2014-0098045 A | 8/2014 |

(Continued)

OTHER PUBLICATIONS

Search Report dated Nov. 22, 2018, issued by the International Searching Authority in counterpart International Patent Application No. PCT/KR2018/009631 (PCT/ISA/210).

(Continued)

*Primary Examiner* — Sang V Nguyen
(74) *Attorney, Agent, or Firm* — Sughrue Mion, PLLC

(57) ABSTRACT

A display includes a display panel for displaying an image; a backlight including a light guide plate disposed behind the display panel for outputting light to the display panel, and a light source that irradiates the light to a first side surface of the light guide plate; and a holder for supporting the display panel and the light guide plate and to have a concave portion that exposes at least a portion of a second side surface of the light guide plate positioned to be opposite to the first side surface of the light guide plate.

11 Claims, 12 Drawing Sheets

(56) References Cited

U.S. PATENT DOCUMENTS

| | | | |
|---|---|---|---|
| 2004/0135936 A1* | 7/2004 | Lee | G02B 6/0043 349/64 |
| 2005/0099556 A1* | 5/2005 | Shimojoh | G02B 6/0021 349/65 |
| 2006/0028836 A1* | 2/2006 | Shin | G02B 6/0088 362/600 |
| 2006/0274224 A1* | 12/2006 | Jeong | G02B 6/0088 349/58 |
| 2011/0134661 A1* | 6/2011 | Cheng | G02F 1/133308 362/615 |
| 2012/0162875 A1* | 6/2012 | Shimomichi | G06F 1/1601 361/679.01 |
| 2013/0223095 A1* | 8/2013 | Kim | G02B 6/0081 362/606 |
| 2014/0307198 A1 | 10/2014 | Park | |
| 2015/0103559 A1 | 4/2015 | Jung et al. | |
| 2015/0168640 A1 | 6/2015 | Jeong et al. | |
| 2016/0131827 A1 | 5/2016 | Lee et al. | |
| 2016/0223739 A1 | 8/2016 | Yoon et al. | |
| 2017/0315408 A1* | 11/2017 | Lee | G02F 1/133308 |

FOREIGN PATENT DOCUMENTS

| | | |
|---|---|---|
| KR | 10-2015-0068583 A | 6/2015 |
| KR | 10-2016-0056458 A | 5/2016 |
| KR | 10-1705356 B1 | 2/2017 |

OTHER PUBLICATIONS

Written Opinion dated Nov. 22, 2018, issued by the International Searching Authority in counterpart International Patent Application No. PCT/KR2018/009631 (PCT/ISA/237).

\* cited by examiner

DISPLAY APPARATUS

CROSS-REFERENCE TO RELATED APPLICATIONS

This application is based on and claims priority under 35 U.S.C. § 119 to Korean Patent Application No. 10-2017-0135996, filed on Oct. 19, 2017, in the Korean Intellectual Property Office, the disclosure of which is incorporated by reference herein in its entirety.

BACKGROUND

Field

The disclosure relates to a display, and more particularly, to a display having an area of a light guide plate smaller than that of a display panel and having a certain optical distance or more.

Description of the Related Art

A display that displays an image is a device that displays the image using a display panel and is used in a variety of devices such as a television, a computer monitor, and a smartphone. However, since a general display does not emit light itself, it requires a backlight unit including a separate light source, and the backlight unit is disposed behind the display panel.

The backlight unit may be classified into a direct-lit type backlight unit in which the light source is disposed behind the display panel and directly irradiates light to the display panel, and an edge-lit type backlight unit in which light is irradiated to a side surface of the light guide plate disposed behind the display panel and the light incident into the light guide plate is uniformly guided to the display panel through the light guide plate.

The display including the edge-lit type backlight unit according to the related art has an advantage that a thickness thereof is thinner than that of the display including the direct-lit type backlight unit because the light source is disposed on a side surface of the light guide plate, but there is a limitation that a size of the display panel is determined to correspond to a size of the light guide plate due to a structure in which a diffusion plate and the display panel are stacked on the light guide plate.

In recent years, the light guide plate having a size smaller than an area of the display panel is used to simplify a process of manufacturing the display and to reduce a cost for manufacturing the display, and the display panel is spaced apart from the light guide plate by a predetermined optical distance to reinforce a surface light source of the light guide plate which is reduced according to the reduced area of the light guide plate. Accordingly, the surface light source of the light guide plate may diffuse light to the display panel through the predetermined optical distance.

However, in this structure, a predetermined level or more of quantity of light may be provided to the display panel which is adjacent to the light source, but since the predetermined level or more of quantity of light is not provided to upper left and right corner portions of the display panel which is relatively far from the light source, there is a problem that the upper left and right corner portions of a screen are viewed to be relatively dark as compared to other portions of the screen.

To solve this problem, according to the related art, a pattern of a predetermined shape is formed on the light guide plate to reinforce light required on the upper left and right portions of the display panel. However, such a solution causes a problem that the light to be provided to other portions of the display panel becomes insufficient and a step is visible on the screen.

SUMMARY

Embodiments of the disclosure overcome the above disadvantages and other disadvantages not described above. Also, the disclosure is not required to overcome the disadvantages described above, and an embodiment may not overcome any of the problems described above.

According to an aspect of the disclosure, a display apparatus includes a display panel configured to display an image; a backlight including: a light guide plate disposed behind the display panel configured to output light to the display panel; and a light source configured to irradiate the light to a first side surface of the light guide plate; and a holder configured to support the display panel and the light guide plate, the holder including a concave portion that exposes at least a portion of a second side surface of the light guide plate positioned to be opposite to the first side surface of the light guide plate.

An inner side surface of the holder may include an inclined surface that may be inclined at a predetermined angle in a direction from an edge of the light guide plate to an edge of the display panel.

The holder may include an upper member, a right member, a lower member, and a left member, and the concave portion may be formed in both side portions of an inner side of the upper member in a direction from the first side surface of the light guide plate to the second side surface of the light guide plate.

The concave portion may be formed as a first edge connected to an inner side edge of the upper member.

The concave portion may further include a second edge which may be positioned to be closer to both ends of the upper member than the first edge.

Any one of the first edge and the second edge may be curved.

The second edge may extend from the inclined surface to a lower side of the light guide plate.

The concave portion may include a reflective surface formed at a position facing the second side surface.

The inclined surface may be formed in a curved surface.

The concave portion may include a protrusion formed in a direction of an inner side of the holder.

According to another aspect of the disclosure, a display apparatus includes: a display panel configured to display an image; a backlight including: a rectangular light guide plate disposed behind the display panel configured to output light to the display panel; and a light source configured to irradiate the light to a first side surface of the light guide plate; and a holder configured to support the display panel and the light guide plate, the holder including an upper member, a right member, a lower member, and a left member, wherein the upper member includes a concave portion that exposes at least a portion of a second side surface positioned to be opposite to the first side surface, and wherein the concave portion may be formed in both side portions of an inner side of the upper member in a direction from the first side surface of the light guide plate to the second side surface of the light guide plate, and the concave portion includes a reflective surface formed at a position facing the second side surface.

BRIEF DESCRIPTION OF THE DRAWING FIGURES

The above and/or other aspects of the disclosure will be more apparent by describing certain embodiments of the disclosure with reference to the accompanying drawings, in which.

DETAILED DESCRIPTION OF THE EMBODIMENTS

Figure 1:
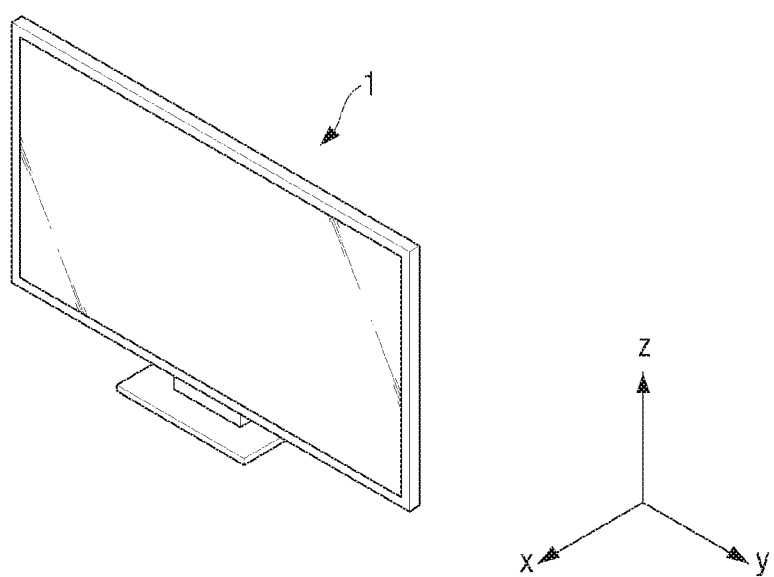
FIG. 1 is a perspective view of a display according to an embodiment.

Embodiments of the disclosure will now be described in detail with reference to the accompanying drawings to facilitate understanding of the configuration and effects thereof. The scope of the disclosure may, however, be embodied in many different forms and should not be construed as limited to the embodiments set forth herein. These embodiments are provided so that this disclosure will be thorough and complete, and will fully convey the scope of the inventive subject matter to those skilled in the art. In the drawings, the size of some of the elements may be exaggerated for convenience of illustration and not drawn on scale for illustrative purposes.

The disclosure provides a display capable of reinforcing insufficient light of corner portions of a display panel at the same time of minimizing an occurrence of a step of a display screen by exposing a portion of a side surface of the light guide plate through a holder structure in which a concave portion is formed.

Terms such as 'first', 'second', etc. can be used to describe various components, but the components are not to be construed as being limited to the terms. These terms may only be used for the purpose of distinguishing one component from another. For example, the 'first' component may be named the 'second' component and the 'second' component may also be similarly named the 'first' component without departing from the scope of the disclosure.

The terms used herein, including technical terms, have the same meanings as terms that are generally understood by those skilled in the art, as long as the terms are not explicitly defined differently.

Hereinafter, a structure and an operation of a display according to an embodiment will be sequentially described with reference to the accompanying drawings.

Figure 2:
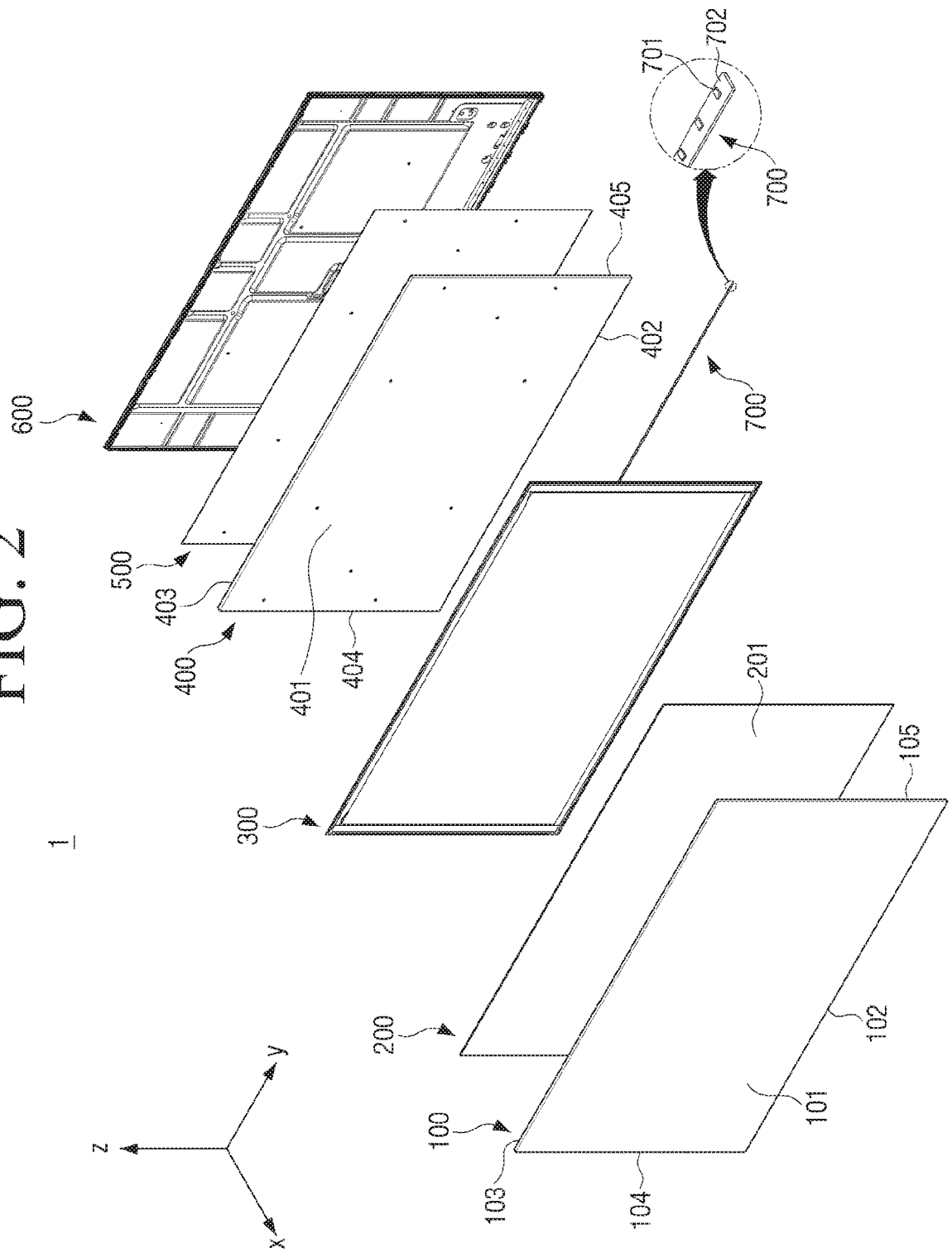
FIG. 2 is an exploded perspective view illustrating the display according to an embodiment.

FIG. 1 is a perspective view of a display according to an embodiment and FIG. 2 is an exploded perspective view illustrating the display according to an embodiment.

A display 1 includes a display panel 100 on which an image is displayed, a diffuser plate 200, a holder 300 that supports the display panel 100 and a light guide plate 400, the light guide plate 400, a reflective sheet 500, a bottom chassis 500, and a backlight unit 700.

The display panel 100 may display various images in the front (a direction of an X axis in FIG. 1) in response to an image signal which is input from the outside, and may include a liquid crystal display (LCD) panel. The display panel 100 may include an upper surface 101 and side surfaces 102, 103, 104, and 105.

The display panel 100 is stacked on an upper surface 201 of the diffuser plate 200. The display panel 100 and the diffuser plate 200 which are stacked are supported by a supporting portion 305 (see FIG. 7A) of the holder 300. In this case, the display panel 100 and the diffuser plate 200 may have an area greater than that of the light guide plate 400 to be described below.

The diffuser plate 200 may diffuse and scatter light emitted from an upper surface 401 of the light guide plate 400, and diffuses the light emitted from the light guide plate 400 to make the overall color and brightness of a screen displayed through the display panel 100 uniform.

Further, the upper surface 201 or a lower surface (no reference numeral) of the diffuser plate 200 may be further coupled with a prism sheet, a protective sheet, a double brightness enhance file (DBEF), and the like.

The prism sheet and the DBEF may increase the brightness by refracting or collecting the light diffused through the diffuser plate 200, and the protective sheet may protect the diffuser plate 200, the prism sheet, the DBEF, and components disposed in the display 1 from external shock or foreign materials.

The light guide plate 400 may guide light incident from a light source 710 to the display panel 100, and convert the light incident from the light source 701 into a surface light source having uniform quantity of light to irradiate it toward the display panel 100.

The light guide plate 400 may emit uniform light through the upper surface 401 (or a light output surface) facing the display panel 100 by refracting, reflecting, and scattering the light incident from the light source 701 therein.

A plurality of light output patterns are formed on the upper surface 401 of the light guide plate 400, thereby making it possible to make a distribution of the light irradiated through the upper surface 401 uniform.

The light guide plate 400 may be formed of poly methyl methacrylate (PMMA), polycarbonate (PC), or the like.

The light guide plate 400 is stacked on an upper surface 501 of the reflective sheet 500. The light guide plate 400 and the reflective sheet 500 which are stacked are fixed in the holder 300 by a first fixing surface 306a (see FIG. 7A) and a second fixing surface 306b (see FIG. 7A) of the holder 300.

The holder 300 that supports the display panel 100, the diffuser plate 200, the light guide plate 400, and the reflective sheet 500 is fixed to the bottom chassis 600.

The reflective sheet 500, which is a configuration capable of reflecting light, may be coupled to the lower surface of the light guide plate 400, and may reflect light toward the lower surface of the light guide plate 400 from the inside of the light guide plate 400 to the inside of the light guide plate 400. The reflective sheet 500 may be formed of polymer, which is a material capable of reflecting light.

The reflective sheet 500 may have an area greater than that of the light guide plate 400. Accordingly, light emitted from first to fourth side surfaces 402 to 405 of the light guide plate 400 to be described below may be reflected by the reflective sheet 500 and may be diffused toward the display panel 100 positioned at the upper side of the light guide plate 400.

The bottom chassis 600, which is a configuration coupled to the holder 300, may fix the display panel 100, the diffuser plate 200, the light guide plate 400, and the reflective sheet 500 together with the holder 300. In addition, the bottom chassis 600 may be fixed to a wall by using a separate fixing member to fix the display 1 to a predetermined position, if necessary.

The backlight unit 700 includes a rectangular light guide plate 400 disposed behind the display panel 100 to output the light to the display panel 100, and a plurality of light sources 701 that irradiate the light toward a first side surface 402 of the light guide plate 400. The plurality of light sources 701 are mounted on a printed circuit board (PCB) 702 along a length direction of the PCB and are driven by electrical signals from a controller and a driver.

The backlight unit 700 may be mounted on the holder 300. However, the backlight unit 700 is not limited thereto, but may be mounted on the bottom chassis 600.

Figure 3:
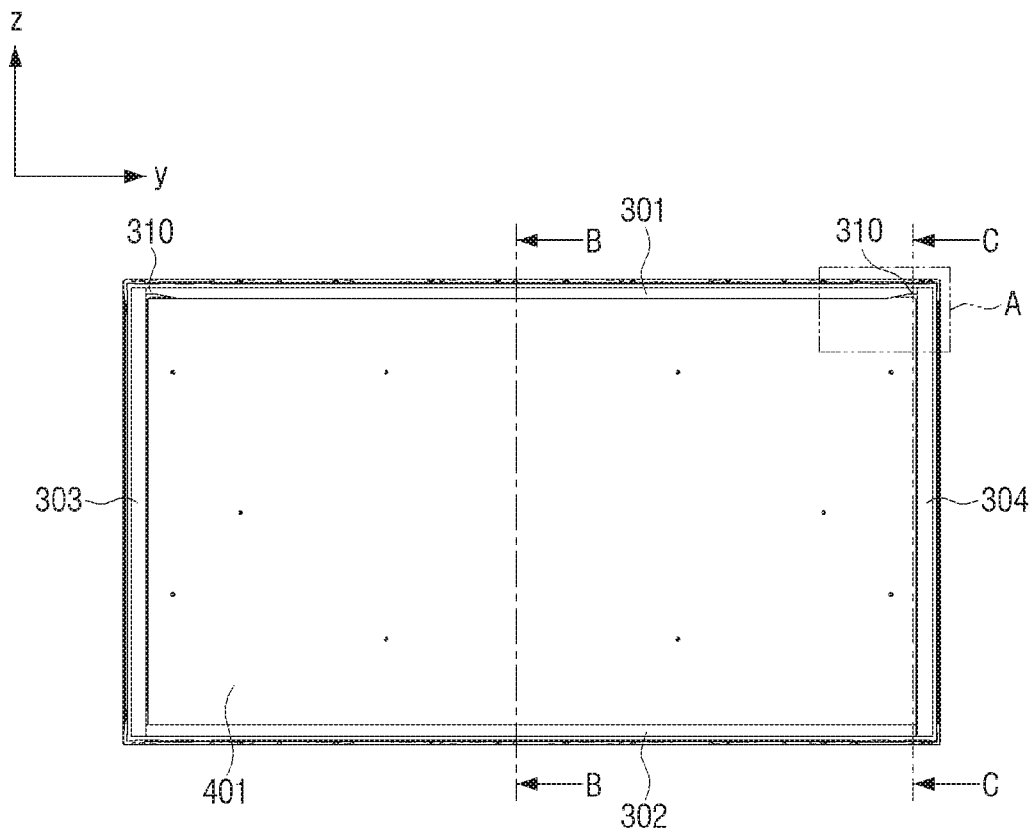
FIG. 3 is a front view illustrating a coupling of a holder, a reflective sheet, and a bottom chassis.

FIG. 3 is a front view illustrating a coupling of a holder, a reflective sheet, and a bottom chassis. In FIG. 3, the display panel 100 and the diffuser plate 200 are omitted for convenience of explanation.

An inner side of the holder to be described below refers to an inner portion in which the light guide plate 400 coupled to the holder 300 is positioned with respect to the holder 300.

The holder 300 includes a upper member 301, a lower member 302 positioned to face the upper member 301, a left member 303 connecting one end of the upper member 301 with one end of the lower member 302, and a right member 304 connecting the other end of the upper member 301 with the other end of the lower member 302. The upper member 301 is disposed at a position facing a second side surface 403 (see FIG. 2) of the light guide plate 400 to fix the upper surface 401 which is adjacent to the second side surface 403 (see FIG. 2) of the light guide plate 400, and the lower member 302 is disposed at a position facing the first side surface 402 (see FIG. 2) to fix the upper surface 401 which is adjacent to the first side surface of the light guide plate 400.

The left member 303 is disposed at a position facing a third side surface 404 (see FIG. 2) of the light guide plate 400, and the right member 304 is disposed at a positioned at a position facing a fourth side surface 405 (see FIG. 2) of the light guide plate 400. The left member 303 and the right member 304 may also fix the third and fourth side surfaces 404 and 405 of the light guide plate 400, but are not limited thereto, and may be disposed to expose the third and fourth side surfaces 404 and 405 of the light guide plate 400 and the upper surface 401 of the light guide plate 400 which is adjacent to the third and fourth side surfaces 404 and 405.

The upper member 301, the lower member 302, the left member 303, and the right member 304 that configure the holder 300 may be separately manufactured and may be coupled integrally when being assembled to the bottom chassis.

An inner side surface of the holder 300 may include an inclined surface 300a (see FIG. 7A) which is inclined at a predetermined angle in a direction of an edge at which the lower surface (no reference numeral) of the display panel 100 and the side surfaces 102 to 105 (see FIG. 2) of the display panel 100 are in contact with each other from an edge at which the upper surface 401 of the light guide plate 400 and the first to fourth side surfaces 402 to 405 are in contact with each other. The holder 300 including the inclined surface 300a may be formed of a material that easily reflects light. Accordingly, the light diffused from the upper surface 401 of the light guide plate 400 is guided to the lower surface (no reference numeral) of the display panel 100 along the inclined surface 300a of the holder 300, thereby making it possible to efficiently diffuse and scatter the light to the display panel 100.

The inclined surface 300a may be formed in a curved surface, if necessary. Accordingly, the light diffused toward the display panel 100 is guided and reflected in a predetermined direction, thereby making it possible to efficiently scan the light in a direction of the display panel 100.

The holder 300 includes a concave portion 310 that exposes at least a portion of the second side surface 403 (see FIG. 2) which is positioned to be opposite to the first side surface 402 (see FIG. 2) of the light guide plate 400.

The concave portion 310 may be formed in both side portions of an inner side of the upper member 301 in a direction from the first side surface 402 of the light guide plate 400 to the second side surface 403 thereof. Here, the both side portion of the inner side of the upper member 301 mean positions which are adjacent to the second side surface 403 of the light guide plate 400 and are adjacent to both end portions of the upper member 301. At least two concave portions 310 may be formed in the upper member 301, if necessary.

The concave portions 310 which are adjacent to the left member 303 and the right member 304 are the same configuration as each other, and only the concave portion 310 which is adjacent to the right member 304 will be described below for convenience of explanation.

The light scanned from the light source 701 is scanned to the first side surface 402 of the light guide plate 400, such that the light is diffused to the display panel 100 through the upper surface 401 of the light guide plate 400. In this case, the light scanned to the light guide plate 400 may also be diffused through the second side surface 403, and the light diffused to the second side surface 403 by the concave portion 310 that exposes the second side surface 403 toward the display panel 100 may also be diffused to corner portions of the display panel 100. Accordingly, insufficient light of the corner portions of the display panel 100 may be reinforced. In addition, the light scanned to the light guide plate 400 is also diffused through the upper surface 401 and the concave portion 310 also exposes a portion of the upper surface 401 which is adjacent to the second side surface 403 of the light guide plate 400 toward the display panel 100, thereby making it possible to reinforce the insufficient light of the corner portions of the display panel 100.

Figure 4A:
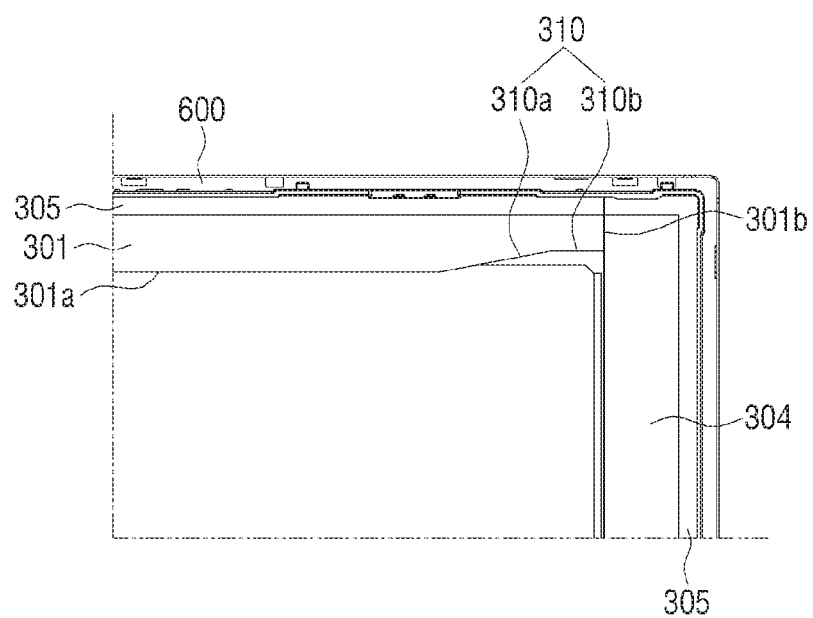
FIG. 4A is an enlarged view of a portion A indicated in FIG. 3.
Figure 4B:
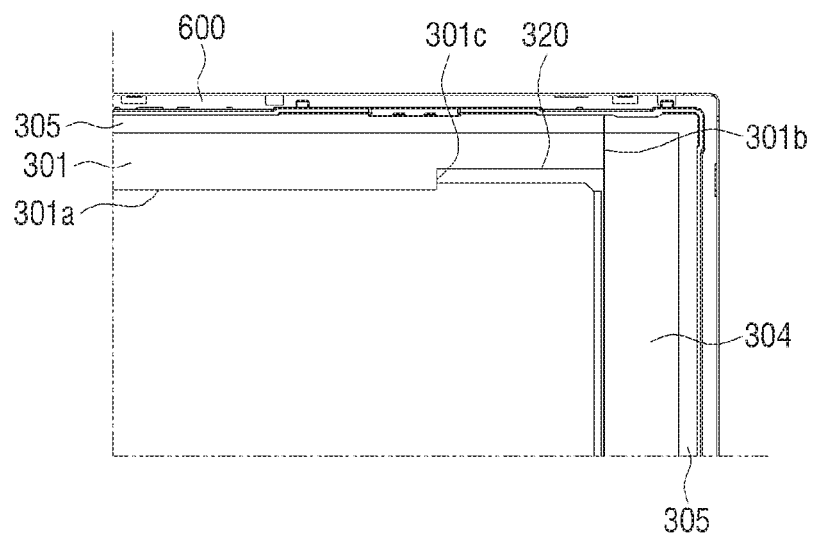
FIGS. 4B and 4C are enlarged views that each illustrate modified examples of a concave portion illustrated in FIG. 4A.
Figure 4C:
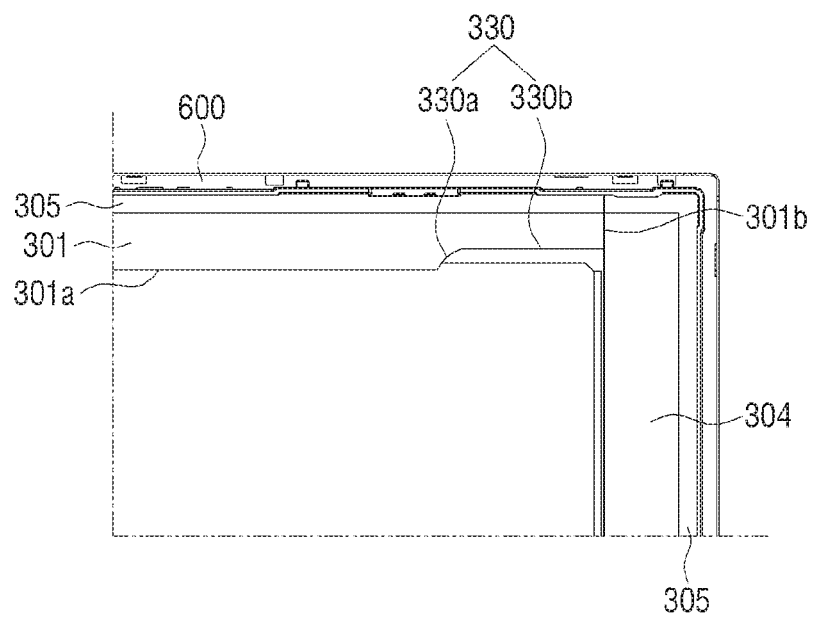

Hereinafter, a shape of the concave portion 310 will be described with reference to FIGS. 4A to 4C. FIGS. 4A to 4C are enlarged views of a portion A indicated in FIG. 3.

The concave portion 310 may include a first edge 310a connected to an inner side edge 301a of the upper member 301 of the holder 300, and a second edge 310b connected to the first edge 310a and positioned to be closer to one end 301b of the upper member 301 than the first edge 310a. Accordingly, the inner side edge 301a of the upper member 301, the first edge 310a, and the second edge 310b are continuously connected to each other, and the upper surface 401 of the light guide plate 400 is push-fixed by a portion of the inner side edge 301a of the upper member 301 and the first edge 310a. In addition, the inner side edge 301a, the first edge 310a, and the second edge 310b are connected to the inclined surface 301a (see FIG. 7A) of the upper member 301.

As illustrated in FIG. 4A, the first edge 310a may be formed in straight line which is an oblique direction, and the second edge 310b may be disposed to be parallel to the second side surface 403 of the light guide plate 400. Accordingly, a portion of the concave portion 310 may fix the upper surface 401 of the light guide plate 400 and expose a portion of the second surface 403 of the light guide plate 400 in the direction of the display panel 100.

FIGS. 4B and 4C are enlarged views that each illustrate modified examples of a concave portion illustrated in FIG. 4A Like components are denoted with like reference numbers and a description thereof will be omitted.

Referring to FIG. 4B, the upper member 301 has an inner side vertical edge 301c perpendicular to the inner side edge 301a. The first edge 320 is formed to be perpendicular to the inner side vertical edge 301c and is disposed to be parallel to the inner side edge 301a while having a predetermined step. The concave portion 320 is formed as a first edge 320. Accordingly, the concave portion 320 may expose a larger portion of the second side surface 403 of the light guide plate 400 as compared to the concave portion 310 of FIG. 4A.

Referring to FIG. 4C, the first edge 330a is formed in a curved line. Accordingly, the inclined surfaces 300a of the upper member 301 connected to the inner side edge 301a, the first edge 330a, and the second edge 330b may be smoothly connected to each other without the line being suddenly changed while exposing the larger portion of the second side surface 403 of the light guide plate 400. However, the first edge 330a is not limited thereto, but at least one of the first edge 330a and the second edge 330b may be formed in a curved line. In this case, a curvature center of the curved line may be positioned inside of the holder 300.

Figure 5A:
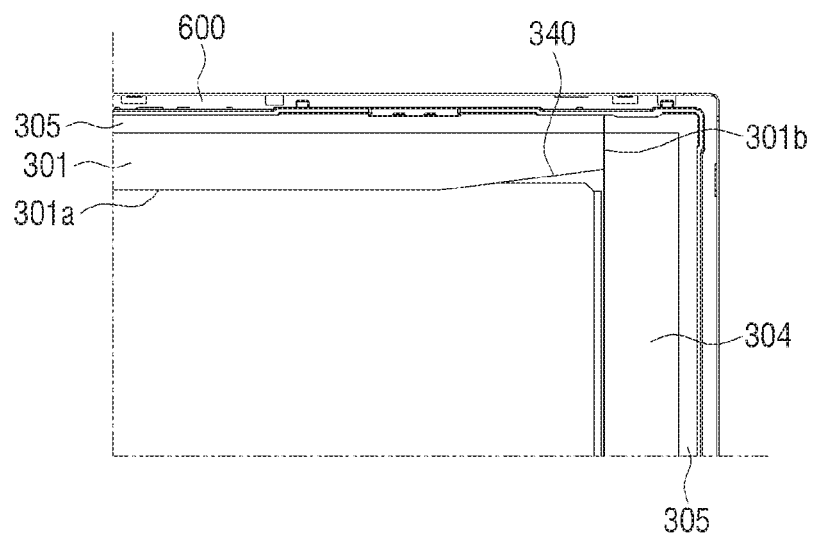
FIGS. 5A and 5B are enlarged views that each illustrate other modified examples of the concave portion illustrated in FIG. 4A.
Figure 5B:
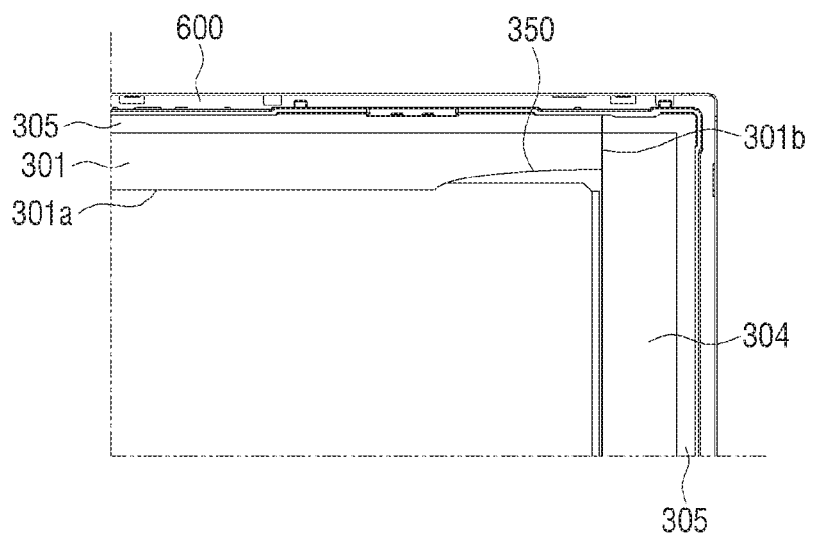

FIGS. 5A and 5B are enlarged views that each illustrate other modified examples of the concave portion illustrated in FIG. 4A. Like components are denoted with like reference numbers and a description thereof will be omitted.

Referring to FIG. 5A, a concave portion 340 may be formed as a first edge 340, and referring to FIG. 5B, the first edge 340 of a concave portion 350 may be formed in a curved line. As described above, the concave portions 310, 320, 330, 340, and 350 are enough as long as they expose a portion of the second side surface 403 of the light guide plate 400, and may have various shapes.

Figure 6:
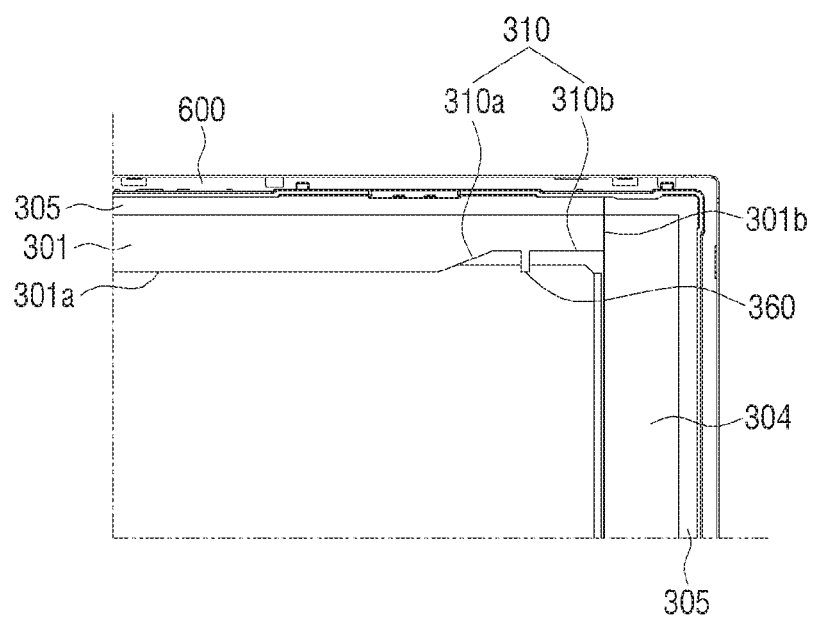
FIG. 6 is an enlarged view that illustrates still another modified example of the concave portion illustrated in FIG. 4A.

FIG. 6 is an enlarged view that illustrates still another modified example of the concave portion illustrated in FIG. 4A.

The concave portion 310 may include a protrusion 360 formed in an inner side direction of the holder 300. When the concave portion 310 is formed largely to expose the second side surface 403 in the direction of the display panel 100, the protrusion 360 may be formed on a portion of the concave portion 310 to fix the upper surface 401 of the light guide plate 400. However, the protrusion 360 may have a small cross-section area in order not to greatly interfere with the light diffused from the upper surface 401 and the second side surface 403 of the light guide plate 400. Accordingly, the concave portion 310 may stably fix the light guide plate 400, and may expose a large portion of the second side surface 403 in the direction of the display panel 100.

Hereinafter, an operation of the display according to an embodiment will be described in detail with reference to FIGS. 7A and 7B.

Figure 7A:
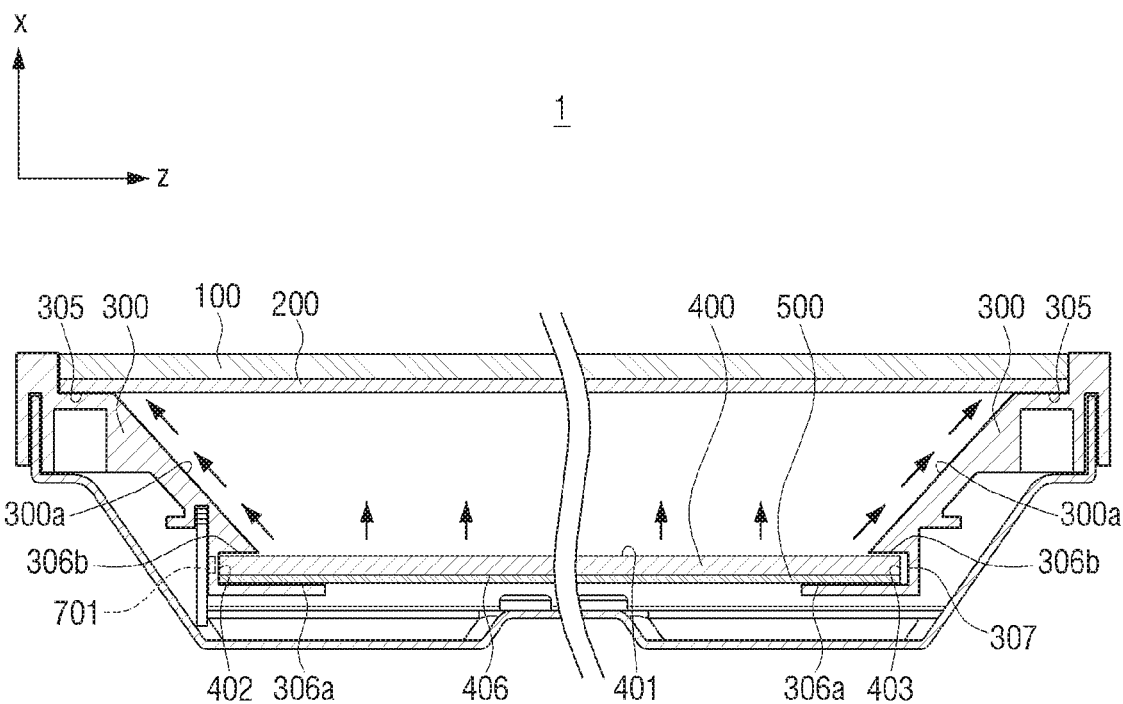
FIG. 7A is a cross-sectional view taken along a line B-B indicated in FIG. 3.
Figure 7B:
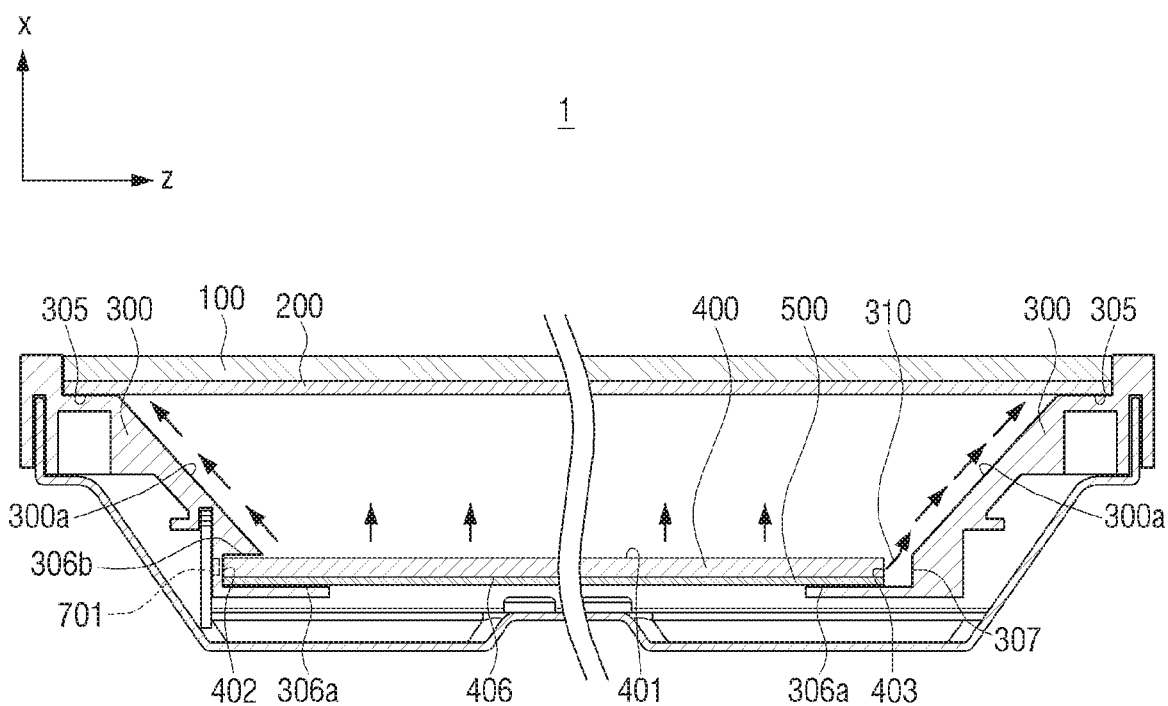
FIG. 7B is a cross-sectional view taken along a line C-C indicated in FIG. 3.

FIG. 7A is a cross-sectional view taken along a line B-B indicated in FIG. 3 and FIG. 7B is a cross-sectional view taken along a line C-C indicated in FIG. 3. Like components are denoted with like reference numbers and a description thereof will be omitted.

Referring to FIG. 7A, the light source 701 (see FIG. 2) of the backlight unit 700 fixed by the holder 300 irradiates light to the first side surface 402 of the light guide plate 400. The irradiated light passes through the first side surface 402 of the light guide plate 400. A portion of the light scanned into the light guide plate 400 is directed to the upper surface 401 of the light guide plate 400 and this light is diffused to the display panel 100 and the diffuser plate 200. The other portion of the light scanned into the light guide plate 400 is directed to the lower surface 406 of the light guide plate 400, and this light is reflected by the reflective sheet 500 positioned on the lower surface 406 of the light guide plate 400 and is diffused toward the upper surface 401 of the light guide plate 400. Still another portion of the light scanned into the light guide plate 400 passes through the second side surface 403 of the light guide plate 400. Thereafter, the light passing through the second side surface 403 is reflected by a reflective surface 307 of the holder 300 disposed at a position facing the second side surface 403, is again incident into the second side surface 403, and passes through the upper surface 401 of the light guide plate 400.

In this case, the reflective surface 307 may be formed of a material having high reflectivity or may be attached with a separate reflective member.

Referring to FIG. 7B, the light source 701 of the backlight unit 700 fixed by the holder 300 irradiates light to the first side surface 402 of the light guide plate 400. The irradiated light passes through the first side surface 402 of the light guide plate 400. A portion of the light scanned into the light guide plate 400 is directed to the upper surface 401 of the light guide plate 400 and this light is diffused to the display panel 100 and the diffuser plate 200. The other portion of the light scanned into the light guide plate 400 is directed to the lower surface 406 of the light guide plate 400, and this light is reflected by the reflective sheet 500 positioned on the lower surface 406 of the light guide plate 400 and is diffused toward the upper surface 401 of the light guide plate 400.

The light passing through the second side surface 403 of the light guide plate 400 may be naturally diffracted by the concave portion 310 that exposes the second side surface 403 in the direction of the display panel 100, and the diffracted light may be diffused to the display panel 100 and the diffuser plate 200. A portion of the light passing through the second side surface 403 may be reflected by a reflective surface 300c formed at a position facing the second side surface 403 and may be diffused to the display panel 100 and the diffuser plate 200.

Accordingly, when the concave portion 310 is formed in the upper member 301, quantity of light diffused to corner portions of the display panel 100 having an optical distance spaced apart from the light source 701 may be increased and insufficient light of the corner portions of the display panel 100 may be reinforced.

Figure 8:
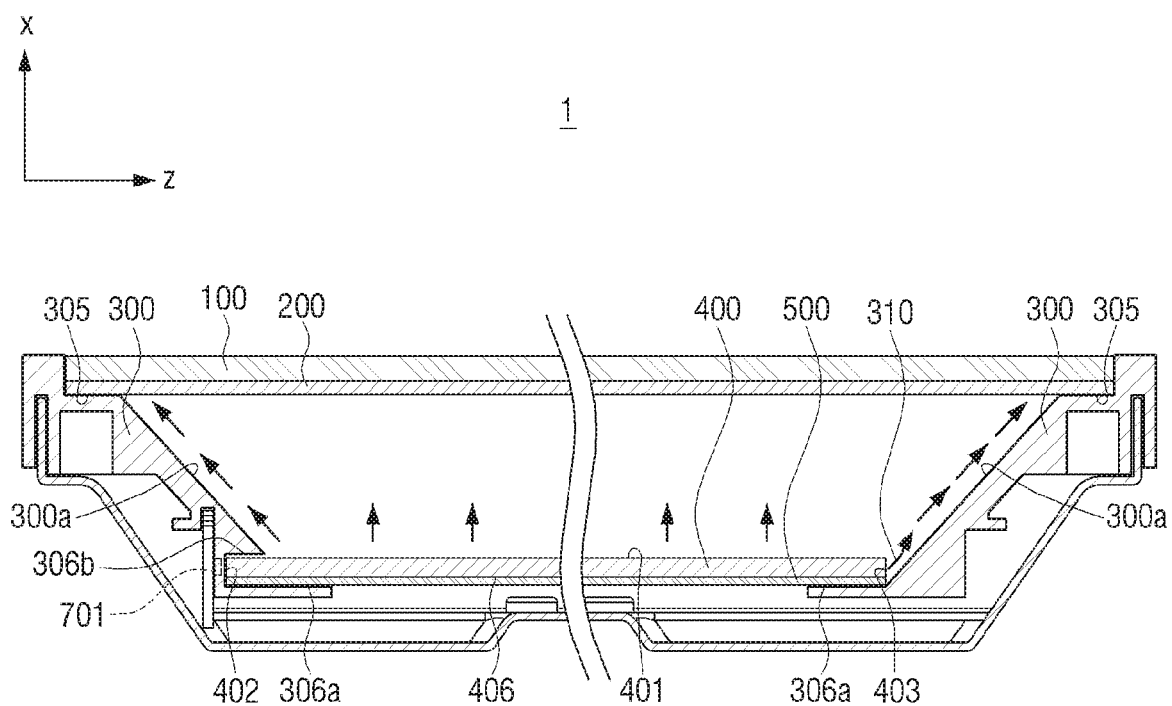
FIG. 8 is a cross-sectional view illustrating a modified example of a holder illustrated in FIG. 7B.

FIG. 8 is a cross-sectional view illustrating a modified example of a holder illustrated in FIG. 7B.

The second edge 310b (see FIG. 4A) extends from the inclined surface 300a to a lower side of the light guide plate.

The light passing through the second side surface 403 of the light guide plate 400 may be reflected or diffused in the direction of the display panel 100 by the inclined surface 300a. Accordingly, the inclined surface 300a that forms a predetermined angle with respect to the display panel 100 may efficiently reflect or diffuse the light passing through the second side surface 403 in the direction of the display panel 100.

Hereinabove, although the embodiments of the disclosure have been shown and described, it should be understood that the disclosure is not limited to the disclosed embodiments and may be variously modified without departing from the spirit and the scope of the disclosure. Therefore, the modifications should not be understood separately from the technical spirit or scope of the disclosure.

What is claimed is:

1. A display apparatus comprising:
    a display panel configured to display an image;
    a backlight comprising:
        a light guide plate disposed behind the display panel configured to output light to the display panel; and
        a light source configured to irradiate the light to a first side surface of the light guide plate; and
    a holder configured to support the display panel and the light guide plate, the holder comprising a concave portion that exposes at least a portion of a second side surface of the light guide plate positioned to be vertically opposite to the first side surface of the light guide plate.

2. The display apparatus as claimed in claim 1, wherein an inner side surface of the holder comprises an inclined surface that is inclined at a predetermined angle in a direction from an edge of the light guide plate to an edge of the display panel.

3. The display apparatus as claimed in claim 2, wherein the holder comprises an upper member, a right member, a lower member, and a left member, and
    the concave portion is formed in both side portions of an inner side of the upper member in a direction from the first side surface of the light guide plate to the second side surface of the light guide plate.

4. The display apparatus as claimed in claim 3, wherein the concave portion is formed as a first edge connected to an inner side edge of the upper member.

5. The display apparatus as claimed in claim 4, wherein the concave portion further comprises a second edge which is positioned to be closer to both ends of the upper member than the first edge.

6. The display apparatus as claimed in claim 5, wherein any one of the first edge and the second edge is curved.

7. The display apparatus as claimed in claim 5, wherein the second edge extends from the inclined surface to a lower side of the light guide plate.

8. The display apparatus as claimed in claim 2, wherein the concave portion comprises a reflective surface formed at a position facing the second side surface.

9. The display apparatus as claimed in claim 8, wherein the inclined surface is formed in a curved surface.

10. The display apparatus as claimed in claim 1, wherein the concave portion comprises a protrusion formed in a direction of an inner side of the holder.

11. A display apparatus comprising:
    a display panel configured to display an image;
    a backlight comprising:
        a rectangular light guide plate disposed behind the display panel configured to output light to the display panel; and
        a light source configured to irradiate the light to a first side surface of the light guide plate; and
    a holder configured to support the display panel and the light guide plate, the holder comprising an upper member, a right member, a lower member, and a left member,
    wherein the upper member comprises a concave portion that exposes at least a portion of a second side surface positioned to be vertically opposite to the first side surface, and
    wherein the concave portion is formed in both side portions of an inner side of the upper member in a direction from the first side surface of the light guide plate to the second side surface of the light guide plate, and the concave portion comprises a reflective surface formed at a position facing the second side surface.

* * * * *